No. 716,370. Patented Dec. 23, 1902.
C. B. BISHOP.
ENGRAVING MACHINE OR THE LIKE.
(Application filed July 5, 1902.)
(No Model.) 2 Sheets—Sheet 2.
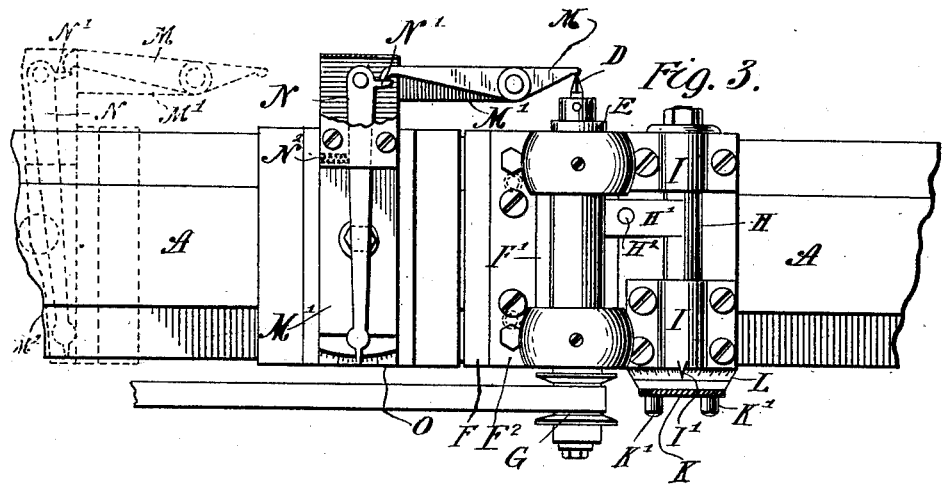
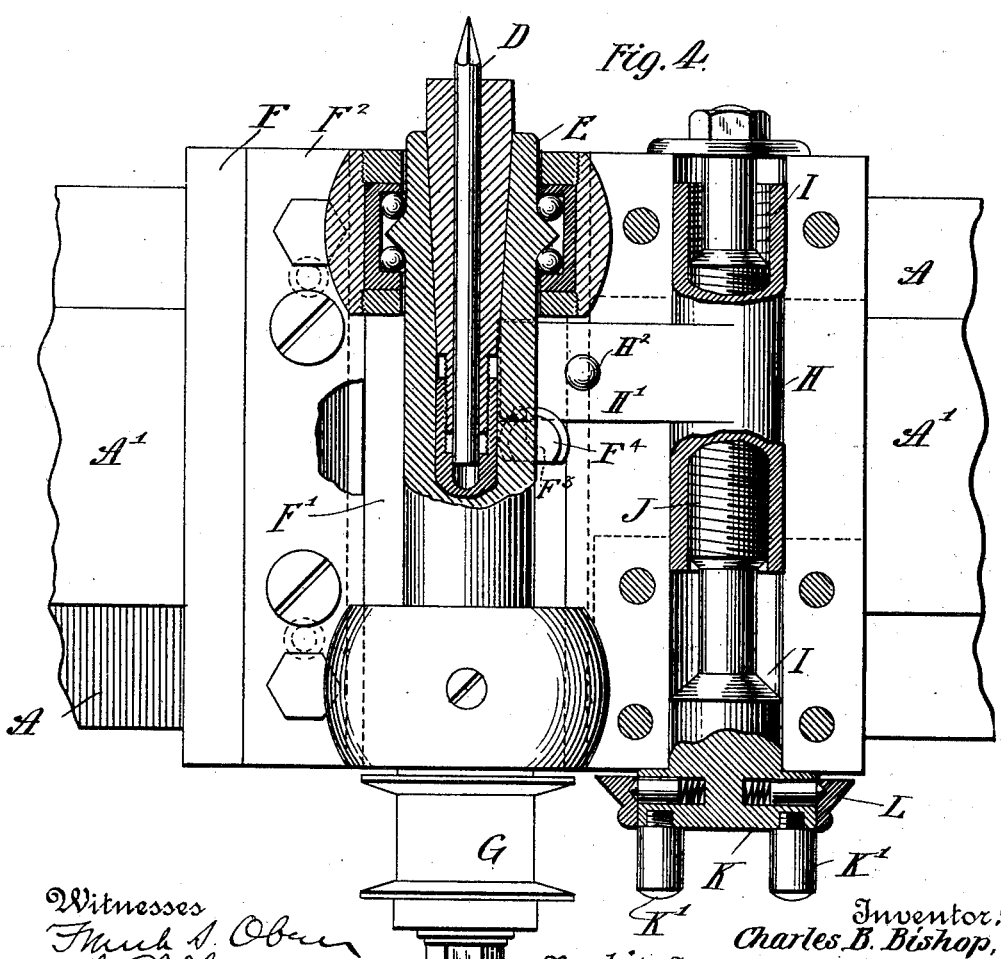
Witnesses
Inventor:—
Charles B. Bishop,
By his Attorney

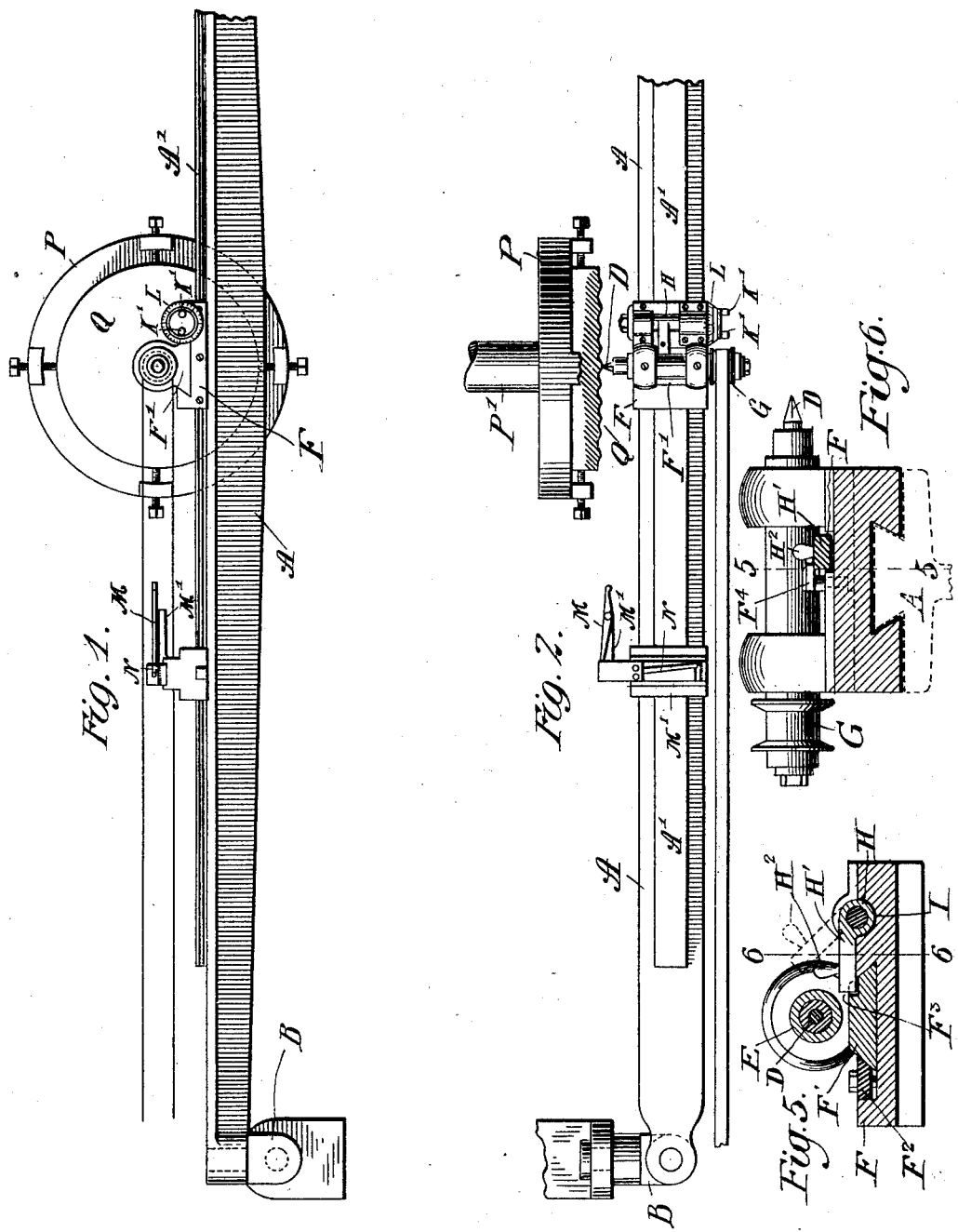

UNITED STATES PATENT OFFICE.

CHARLES B. BISHOP, OF NEW BRITAIN, CONNECTICUT, ASSIGNOR TO P. & F. CORBIN, OF NEW BRITAIN, CONNECTICUT, A CORPORATION OF CONNECTICUT.

ENGRAVING-MACHINE OR THE LIKE.

SPECIFICATION forming part of Letters Patent No. 716,370, dated December 23, 1902.

Original application filed November 7, 1901, Serial No. 81,461. Divided and this application filed July 5, 1902. Serial No. 114,398. (No model.)

*To all whom it may concern:*

Be it known that I, CHARLES B. BISHOP, a citizen of the United States, residing at New Britain, in the county of Hartford, State of Connecticut, have invented certain new and useful Improvements in Engraving-Machines or the Like, of which the following is a full, clear, and exact description.

My invention relates to engraving-machines and the like, particularly to that type shown in my former application, Serial No. 81,461, filed November 7, 1901, now Patent No. 709,863, from which this is a divisional application. In that machine and in other analogous machines cutters are provided to work into a block of metal to a degree determined by a pattern, and in such machines it is desirable to have a means whereby the cutter may be set at a predetermined or standard position and adjusted therefrom so that any wear or inaccurate adjustment of the tool may be readily detected and corrected.

To that end, therefore, it is my purpose, and the object of this invention is, to provide mechanism whereby the operator may accurately set the cutter in a certain predetermined position and then adjust it so that in case the cutter should wear it may be quickly readjusted to the proper degree and so that if the wear becomes so great as to impair the effectiveness of the tool it may be expeditiously replaced by another.

In the drawings, Figure 1 is a side elevation. Fig. 2 is a plan view. Fig. 3 is an enlarged plan view of details of construction, and Fig. 4 is a still greater enlarged view of certain details of construction shown in Fig. 3, the parts being shown in section. Fig. 5 is a cross-section on the line 5 5 of Fig. 6. Fig. 6 is a cross-section on the line 6 6 of Fig. 5.

In this application I have shown only the parts related directly to the subject-matter hereof and have not pretended to show a complete engraving-machine, such as shown in my patent cited above and to which reference may be had.

A is a beam universally mounted at B, suitable means being provided to cause the said beam to move upwardly or downwardly and inwardly or outwardly. Upon the beam is carried a cutting-tool D, the said cutting-tool being somewhat analogous to a drill and being detachably mounted in a suitable chuck, in turn carried in a revoluble spindle E. The spindle E may be hollow and is mounted on a carriage F. The track A' may be a dovetailed rib formed on the upper surface of the beam A, and the lower side of the carriage may be shaped to fit the rib, so that it may be moved thereon lengthwise and set in any desired position. Antifriction-bearings—for example, ball-bearings—may be provided for the spindle E.

G is a pulley to which a power-driven belt may be connected to revolve the spindle E and tool D.

The carriage F may be formed of two parts, a base portion and a sliding portion F', said sliding portion immediately supporting the spindle E. In the preferred construction there is an undercut groove in the base portion of the carriage F, and the lower side of the sliding portion F' is fitted into the undercut groove or recess, so that the spindle E itself may be shifted longitudinally. The plate $F^2$ is bolted to the main carriage portion F and adapted to frictionally hold the slide F' in position or to provide the proper frictional engagement therefor. At one side of the member F' is an internally-threaded sleeve H, having an arm H', which engages the carriage F' in a recess $F^3$ at one side. The sleeve H is pivoted and has suitable bearings I I at each end thereof. The arm H' may be thrown into or out of engagement with the carriage F' by means of the knob $H^2$, and thus free the spindle E, so that the spindle may be withdrawn to remove the cutter without disturbing the work. The latch $F^4$ is provided for holding the extension H' down into engagement with the slide F' of the carriage F. This latch may be revolved to disengage the parts when it is desired to lift the extension H'. Within the sleeve is a screw J, which may be revolved, but which is so fitted to the bearings I I in the frame as to be immovable longitudinally. It is apparent that if the screw J is revolved the sleeve H must move longitudinally thereon, and when the arm $H^2$ is down in the recess $F^3$ of the carriage F' a similar movement must necessarily be imparted thereto. In this way and by revolving said screw J in one direction or the other a corresponding longitudinal movement will be imparted to the cutting-tool D, so that the position of the point of the cutting-tool may be finely adjusted.

K is a knob on the end of the screw J, said knob being fitted with any suitable handle—for example, the handles K' K'—whereby it may be revolved. Mounted friction-tight upon the knob K is a ring L, bearing suitable graduations.

To ascertain the exact position of the point of the cutting-tool D at any time and in order that the slightest wear may be detected and compensated, I provide a setting mechanism constructed substantially as follows:

M is a lever carried by a bracket M', slidably mounted upon the track A' of the beam. One end of the lever M is adapted to be moved so as to engage the point of the cutter D. The other end of the lever M is adapted to bear against an offset N' upon a pointer N.

O is an index carried by the body of the bracket M'. Upon the index O is a graduation indicating what will be termed herein the "standard-point."

When the setting mechanism is applied, unless the pointer N points to the standard-point the operator must either advance or retract said cutting-tool until the standard-point is obtained. This preliminary advancing or retracting of the cutting-tool may be done manually or it may be effected by rotating the knob K, so as to move the part F' of the carriage F to the proper degree and in the right direction. When the pointer N stands over the standard-point on the index O, the sliding portion F', holding the spindle, chuck, and cutter, is tightened to the carriage F. The spring $N^2$ may hold the pointer N normally to the right, Fig. 3, and thus move the lever M into contact with the cutter D. This yielding system of levers entirely avoids any danger of injury to the point of the cutting-tool when effecting adjustments. If the occasion demanded that the operative position of the cutter should be one-tenth of an inch advanced beyond this and it is known that the pitch of the thread upon the screw J is one-tenth of an inch, it is simply necessary to rotate the knob K one complete revolution. In order to permit the user to know with accuracy that he has rotated said screw one complete revolution, no more and no less, the graduated scale L is first turned so that the zero-mark or standard-point thereon will stand directly under a stationary pointer I', adjacent to said scale and best seen in Fig. 3. The operator may then turn the knob, and the said graduated scale, being mounted friction-tight upon said knob, will rotate therewith until the zero-mark or standard-point is again reached, whereupon the operator knows to a certainty that the screw has been rotated exactly one revolution and that the cutter has been advanced or retracted exactly one-tenth of an inch beyond the standard-point. Prior to this operation the setting mechanism may be moved to one side and out of the way. If it is desired to advance or retract the cutter a fraction of one-tenth of an inch, it may be readily done by simply rotating the knob K the desired fraction, which may be indicated by the graduations upon the ring L. Manifestly if it is desired to advance or retract the cutter more than one-tenth of an inch it may be done by revolving the knob K to the extent necessary to cause the proper advancement or retraction of said cutting-tool.

In Fig. 1, P is a revoluble carrier, conventionally shown. The carrier P is mounted upon a suitable shaft P' and revolved in any desired way and at the proper speed. Q is a block of metal clutched by said carrier P and revolved thereby. It is this block of metal that the cutter D is adapted to work into. The cutter D is moved toward or away from the carrier P by means of the beam A.

In the machine made the subject-matter of my Patent No. 709,863 I have illustrated the particular means employed by me for moving the beam A in any direction. It is an automatic means engaging the free end of the beam and causing it to be slowly elevated or depressed and to normally press toward the cutter. A pattern (not shown) mounted in a carrier similar to the carrier P and revoluble at the same angular speed and in the same direction is also employed, but not shown herein. A stylus point or finger is also carried by the beam A and bears frictionally upon the face of the pattern. Consequently as the pattern is revolved and as the beam A is elevated or depressed the stylus will traverse the pattern in a very fine spiral curve and the cutter D will traverse the block Q in a similar manner, reproducing therein a figure corresponding to the pattern.

In referring to the pattern and the parts associated therewith and the means for moving the beam I have spoken generally of what is shown in my former application to which reference is made. It might be said that in general these features are found in other machines known in the art, and therefore they are not subject-matter for special illustration herein, particularly as no claims are made herein for said features.

What I claim is—

1. In a device of the character described, a revoluble spindle longitudinally movable for supporting a cutting-tool, a beam for supporting the same, and a mechanism for indicating the position of the tool comprising a bracket slidably mounted upon said beam and a lever carried by said bracket yieldingly pressed so as to contact with the cutting-tool.

2. In a device of the character described, a revoluble spindle longitudinally movable for supporting a cutting-tool, a beam for supporting the same, and a mechanism for indicating the position of the tool comprising a bracket slidably mounted upon said beam, a lever M carried thereby, a pointer having a long arm and a short arm, said short arm engaging one end of said lever, and a spring for normally pressing against one arm of said pointer, the free end of said lever being adapted to engage with the cutting-tool.

3. In a device of the character described, a longitudinally-adjustable revoluble tool-supporting spindle, means for shifting the position of the same in combination with mechanism comprising a lever, a pointer having an offset or shoulder, one end of the lever bearing against said shoulder, the opposite end of the lever being adapted to bear against the point of the tool designed to be carried by the spindle, an index point or mark in the arc of movement of the end of the pointer, and a common support for both the spindle and the mechanism, said mechanism being slidably mounted on said support.

4. In a device of the character described, a longitudinally-movable frame, a rotatable tool-spindle carried thereby, a longitudinally-shifting sleeve having an arm adapted to be engaged with or disengaged from said spindle-carrying frame for adjusting the position of the same.

5. In a device of the character described, a movable frame, a spindle carried thereby, a pivoted shifting sleeve, means for adjusting the position of said sleeve, said sleeve having an extension-arm engaging in a recess in said spindle-carrying frame.

6. In a device of the character described, a movable frame, a rotatable tool-carrying spindle carried thereby, a pivoted shifting sleeve, means for adjusting the longitudinal position of said sleeve, said sleeve having an extension-arm engaging in a recess in said spindle-carrying frame whereby said spindle may be moved forward or backward either by said sleeve or independently thereof.

7. In a device of the character described, a beam, a carriage slidably mounted thereon, a revoluble tool-carrying spindle mounted on said carriage and adapted to be adjusted transversely of said beam, means for effecting such adjustment, and a yielding means also slidably carried by said beam for indicating the position of the tool carried by said spindle.

8. A device of the character described having in combination a revoluble tool-carrying spindle, longitudinally-movable means for effecting the longitudinal adjustment of the same, a frictionally-mounted graduated index-dial coöperating with said means for adjustment and means for engaging or disengaging the connection between said adjusting means and said spindle whereby said spindle may be longitudinally moved by said adjusting means or independently thereof, and a pointer independent of the adjusting means for indicating the position of the tool.

9. A device of the character described having in combination a tool-carrying spindle, means for effecting the longitudinal adjustment of the same, an index-dial coöperating with said adjusting means, means for engaging or disengaging the connection between said adjusting means and said spindle whereby said spindle may be moved longitudinally by said adjusting means or independently thereof, and a pointer for indicating the position of the tool independently of the adjusting means.

10. In a device of the character described, a rotatable tool-carrying spindle longitudinally movable, means for effecting the adjustment of the same including a longitudinally-movable sleeve, an extension-arm therefrom for engaging or disengaging said spindle, and a latch for securing said extension-arm in its engaged position and releasing same when desired.

11. In a device of the character described, a longitudinally-movable frame, a rotatable tool-spindle carried thereby, a longitudinally-shifting sleeve having an arm adapted to be engaged with or disengaged from said spindle-carrying frame for adjusting the position of the same and a movable yielding means for indicating the position of the tool.

12. In a device of the character described, a longitudinally-movable frame, a rotatable tool-spindle carried thereby, a longitudinally-shifting sleeve having an arm adapted to be engaged with or disengaged from said spindle-carrying frame for adjusting the position of the same, a screw engaging said sleeve to shift the same and a graduated dial for indicating the rotation of said screw.

13. A device of the character described comprising a beam, a revoluble tool-carrying spindle, mounted thereon and adapted to be adjusted transversely thereof, means for effecting such adjustment, a rotatable graduated index-dial coöperating therewith and a yielding means slidably mounted on said beam for indicating the position of the tool carried by said spindle.

14. A device of the character described including a rotatable and longitudinally-movable tool-carrying spindle, means for adjusting the position of the same, a graduated dial for indicating the movement of said means and a yielding means for indicating the position of the tool-carrying spindle independently of said adjusting means.

15. A device of the character described comprising a beam, a revoluble longitudinally-movable tool-carrier mounted thereon, means for effecting the longitudinal adjustment thereof, and means for determining the position of the tool, said positioning means being mounted to slide upon said beam toward or away from the tool.

Signed at New Britain, Connecticut, this 1st day of July, 1902.

CHARLES B. BISHOP.

Witnesses:
G. E. ROOT,
C. A. BLAIR.